US008835803B2

(12) United States Patent
Lim et al.

(10) Patent No.: US 8,835,803 B2
(45) Date of Patent: Sep. 16, 2014

(54) LASER CUTTING METHOD AND METHOD OF MANUFACTURING ORGANIC LIGHT-EMITTING DEVICE

(75) Inventors: Won-Kyu Lim, Yongin (KR);
Hyun-Chul Lee, Yongin (KR);
Alexander Voronov, Yongin (KR);
Jae-Seok Park, Yongin (KR);
Cheol-Lae Roh, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 677 days.

(21) Appl. No.: 12/929,061

(22) Filed: Dec. 28, 2010

(65) Prior Publication Data

US 2011/0155705 A1 Jun. 30, 2011

(30) Foreign Application Priority Data

Dec. 29, 2009 (KR) .................. 10-2009-0132819

(51) Int. Cl.
*B23K 26/00* (2014.01)
*B23K 26/16* (2006.01)
*B23K 26/40* (2014.01)
*B23K 26/38* (2014.01)

(52) U.S. Cl.
CPC ............. *B23K 26/409* (2013.01); *B23K 26/403* (2013.01); *B23K 26/38* (2013.01)
USPC .................. 219/121.72; 219/121.67

(58) Field of Classification Search
USPC .......................................... 219/121.6–121.83
See application file for complete search history.

(56) References Cited

U.S. PATENT DOCUMENTS

| 4,908,493 | A | * | 3/1990 | Susemihl ................ 219/121.67 |
| 5,670,773 | A | * | 9/1997 | Planeix .................. 219/121.78 |
| 5,886,320 | A | * | 3/1999 | Gallo et al. ............. 219/121.72 |
| 5,916,460 | A | * | 6/1999 | Imoto et al. ............ 219/121.67 |
| 6,129,723 | A | * | 10/2000 | Anderson et al. ............... 606/13 |
| 6,512,196 | B1 | | 1/2003 | Yoon et al. |
| 2005/0074207 | A1 | | 4/2005 | Shioda et al. |
| 2006/0278619 | A1 | | 12/2006 | Acker et al. |
| 2009/0275158 | A1 | | 11/2009 | Okamoto et al. |
| 2010/0167076 | A1 | | 7/2010 | Nishida et al. |

FOREIGN PATENT DOCUMENTS

| JP | 2004-155159 | | 6/2004 |
| JP | 2005-046849 | A | 2/2005 |
| JP | 2005-284248 | A | 10/2005 |
| JP | 2007-062074 | * | 3/2007 |
| JP | 2008-302376 | A | 12/2008 |
| JP | 2009-265542 | A | 11/2009 |
| KR | 10 1998-0061965 | A | 10/1998 |
| KR | 10 2001-0028412 | A | 4/2001 |
| KR | 10 2006-0129966 | A | 12/2006 |
| KR | 10-2008-0070650 | | 7/2008 |
| KR | 10 2009-0027139 | A | 3/2009 |
| WO | WO-2007/043884 | A2 | 4/2007 |

* cited by examiner

*Primary Examiner* — Sang Y Paik
(74) *Attorney, Agent, or Firm* — Lee & Morse, P.C.

(57) ABSTRACT

A laser cutting method includes providing a multi-layered substrate, such that the multi-layered substrate includes a circuit pattern between stacked first and second substrates, and removing a part of the second substrate by irradiating a laser beam on the second substrate, the laser beam being irradiated at an oblique angle with respect to an upper surface of the second substrate.

15 Claims, 2 Drawing Sheets

LASER CUTTING METHOD AND METHOD OF MANUFACTURING ORGANIC LIGHT-EMITTING DEVICE

BACKGROUND

1. Field

Example embodiments relate to a laser cutting method and a method of manufacturing an organic light-emitting device, and more particularly, to a laser cutting method that slantly irradiates a laser beam, and a method of manufacturing an organic light-emitting device.

2. Description of the Related Art

A general laser cutting method is performed by forming a V-shaped groove on a subject to be cut by using a laser beam having a short pulse, and then cutting the subject. The laser beam having a short pulse instantly supplies higher pulse energy to the subject than a laser beam having a long pulse, thereby minimizing thermal damage to the subject. However, the laser cutting method using the laser beam having a short pulse may still damage the elements adjacent to the subject.

SUMMARY

Embodiments are therefore directed to a laser cutting method and a method of manufacturing an organic light-emitting device using the same, which substantially overcome one or more of the problems due to the limitations and disadvantages of the related art.

It is therefore a feature of an embodiment to provide a laser cutting method capable of reducing energy penetration to a circuit pattern during a cutting process by slantly irradiating a laser beam with respect to a cutting surface.

It is therefore another feature of an embodiment to provide a method of manufacturing an organic light-emitting device by using a laser cutting method capable of reducing energy penetration to a circuit pattern during a cutting process by slantly irradiating a laser beam with respect to a cutting surface.

At least one of the above and other features and advantages may be realized by providing a laser cutting method, including providing a multi-layered substrate, such that the multi-layered substrate includes a circuit pattern between stacked first and second substrates, and removing a part of the second substrate by irradiating a laser beam on the second substrate, the laser beam being irradiated at an oblique angle with respect to an upper surface of the second substrate.

Irradiating the laser beam on the second substrate may include irradiating a completely polarized laser beam to be incident on the upper surface of the second substrate, such that the laser beam is bi-directionally polarized after being refracted at the upper surface of the second substrate. A part of the bi-directionally polarized laser beam may be reflected at a bottom surface of the second substrate, the bottom surface of the second substrate being opposite the upper surface and facing the first substrate. A refraction angle of the laser beam may satisfy a Brewster's angle. An incidence angle of the laser beam may satisfy a Brewster's angle. Irradiating the laser beam on the upper surface of the second substrate may include having at least a portion of the laser beam incident on the circuit pattern at an oblique angle.

At least one of the above and other features and advantages may also be realized by providing a method of manufacturing an organic light-emitting device, including preparing a substrate in which an organic light-emitting unit and a circuit pattern are formed, combining the substrate and an encapsulation substrate, and removing a part of the encapsulation substrate by irradiating a laser beam on the encapsulation substrate, wherein the laser beam is slantly irradiated on the encapsulation substrate.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
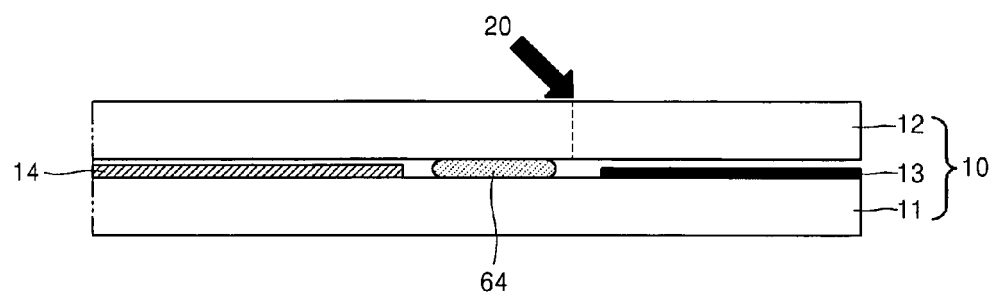
FIG. 1 illustrates a schematic cross-sectional view of a layer of an organic light emitting diode device cut by a laser cutting method according to embodiments.

Korean Patent Application No. 10-2009-0132819, filed on Dec. 29, 2009, in the Korean Intellectual Property Office, and entitled: "Laser Cutting Method and Method of Manufacturing Organic Light-Emitting Device," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

While such terms as "first," "second," etc., may be used to describe various components, such components must not be limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

A laser cutting method and a method of manufacturing an organic light-emitting device according to certain embodiments will be described below in more detail with reference to the accompanying drawings. FIG. 1 illustrates a cross-sectional view for describing a laser cutting method according to embodiments.

Referring to FIG. 1, a multi-layered substrate 10 may include a first substrate 11 on which a circuit pattern 13 is formed, and a second substrate 12 stacked on the first substrate 11. According to the present embodiment, the first substrate 11 may be a low-temperature poly-silicon (LTPS) substrate that may be used to manufacture an organic light emitting diode (OLED) device, and an organic light-emitting unit 14 and the circuit pattern 13 may be formed on the first substrate 11. Here, the circuit pattern 13 may be connected to an external device (not shown) during a process described later, and may transmit an electric signal to the external device. The organic light-emitting unit 14 may be controlled by a signal received from the circuit pattern 13 and may emit red, green, and/or blue light according to a pixel. After the organic light-emitting unit 14 and the circuit pattern 13 are formed on the first substrate 11, the second substrate 12 may be stacked on the first substrate 11 to cover and protect the organic light-emitting unit 14 and the circuit pattern 13 from the external atmosphere. The second substrate 12 may be a glass substrate. According to an embodiment, the second substrate 12 may be an encapsulation substrate of the OLED device.

The multi-layered substrate 10 according to an embodiment will now be described in more detail with respect to FIG. 2.

Figure 2:
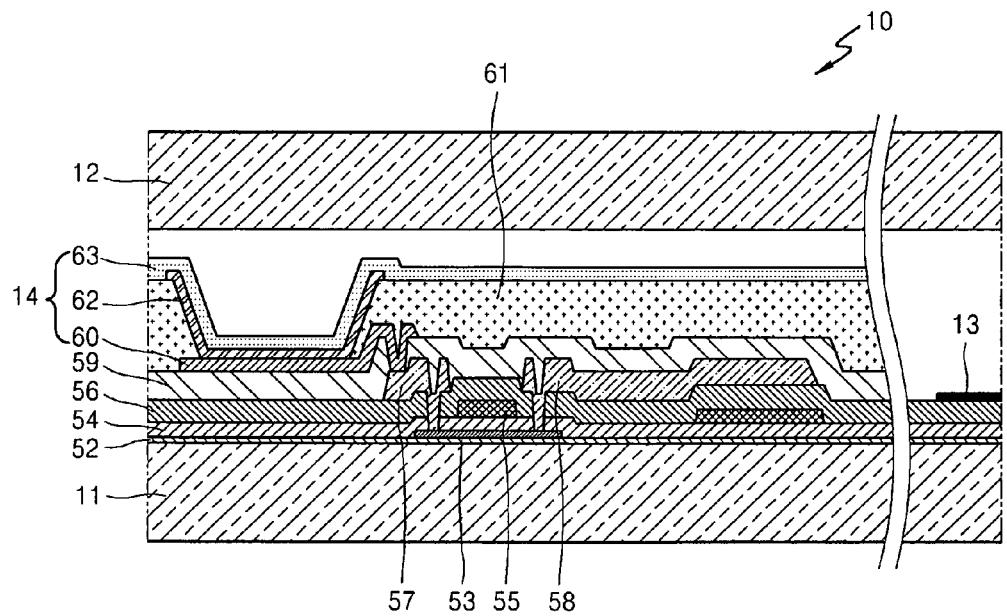
FIG. 2 illustrates a detailed cross-sectional view of the organic light emitting diode device in FIG. 1.

Referring to FIG. 2, an organic emission layer 62 may be patterned on a pixel electrode 60, so that an active matrix (AM) type OLED device may be formed on the multi-layered substrate 10. In the multi-layered substrate 10 according to the present embodiment, a buffer insulation layer 52 may be deposited on the first substrate 11, an active layer 53 may be partially formed on the buffer insulation layer 52, and the active layer 53 may be covered with a gate insulation layer 54. The active layer 53 may have a polysilicon structure after amorphous silicon is deposited and then a crystallization process is performed.

A gate electrode 55 may be partially formed on the gate insulation layer 54, and an interlayer insulation layer 56 may be deposited on the gate electrode 55 and the gate insulation layer 54. Then, a drain electrode 57 and a source electrode 58 may be partially formed on the interlayer insulation layer 56. The drain electrode 57 and the source electrode 58 penetrate the interlayer insulation layer 56 to contact the active layer 53 and may be covered with a passivation layer 59, thereby completing formation of a thin-film transistor (TFT). The drain electrode 57 may be connected to the pixel electrode 60 partially formed on the passivation layer 59 to transfer an output voltage of the TFT.

A pixel definition layer 61 may be formed on the passivation layer 59 and may expose a portion of the pixel electrode 60. The organic emission layer 62 may be patterned on the exposed portion of the pixel electrode 60. After the organic emission layer 62 is patterned, a second electrode 63 may be formed on the organic emission layer 62 in a direction crossing the pixel electrode 60, thereby completing the formation of the organic light-emitting unit 14 that emits light according to a voltage difference between the pixel electrode 60 and the second electrode 63.

Then, the circuit pattern 13 that is electrically connected to the organic light-emitting unit 14 to transmit an external electric control signal to the organic light-emitting unit 14 may be formed on the pixel definition layer 61. The circuit pattern 13 operates as a pad unit that is exposed and connected to an external electronic device.

Next, the second substrate 12, i.e., an encapsulation substrate, covering and protecting the organic light-emitting unit 14 and the circuit pattern 13 may be stacked on the organic light-emitting unit 14 and the circuit pattern 13, thereby completing the formation of the multi-layered substrate 10 according to the current embodiment. The second substrate 12 may be connected with the first substrate 11 by, e.g., a sealant 64 disposed between the organic light-emitting unit 14 and the circuit pattern 13, as shown in FIG. 1. The second substrate 12 protects the organic light-emitting unit 14 from moisture and oxygen. A portion of the second substrate 12 may be partially removed in an area other than the organic light-emitting unit 14, so that the circuit pattern 13 may be electrically connected to the external electronic device. Accordingly, a laser beam 20 may be irradiated on the second substrate 12 to cut a portion thereof in order to expose the circuit pattern 13, and thus, the circuit pattern 13 functioning as the pad unit of the OLED device may be properly connected to the external electronic device to transmit an electric signal therefrom.

Figure 3:
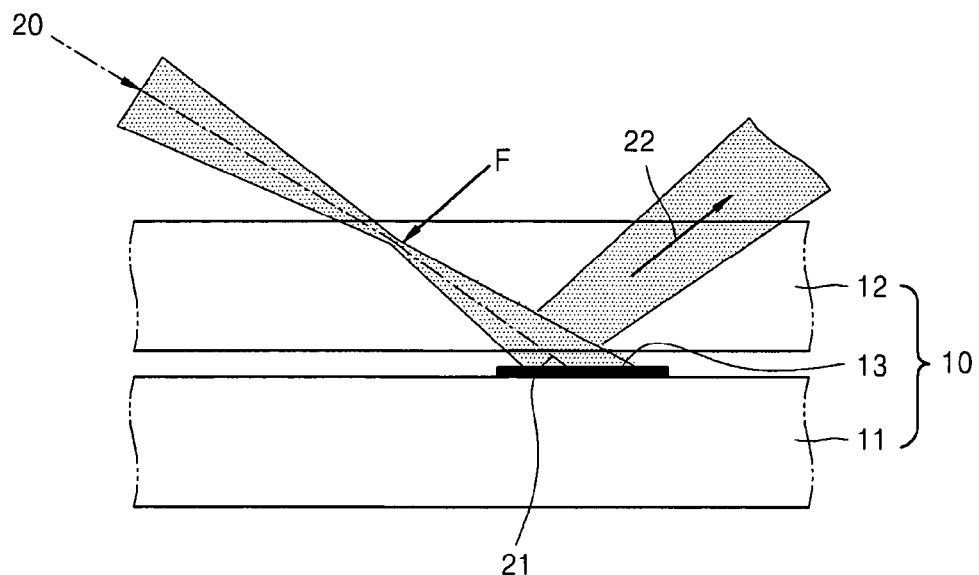
FIGS. 3 and 4 illustrate schematic diagrams for describing a laser cutting method according to embodiments.
Figure 4:
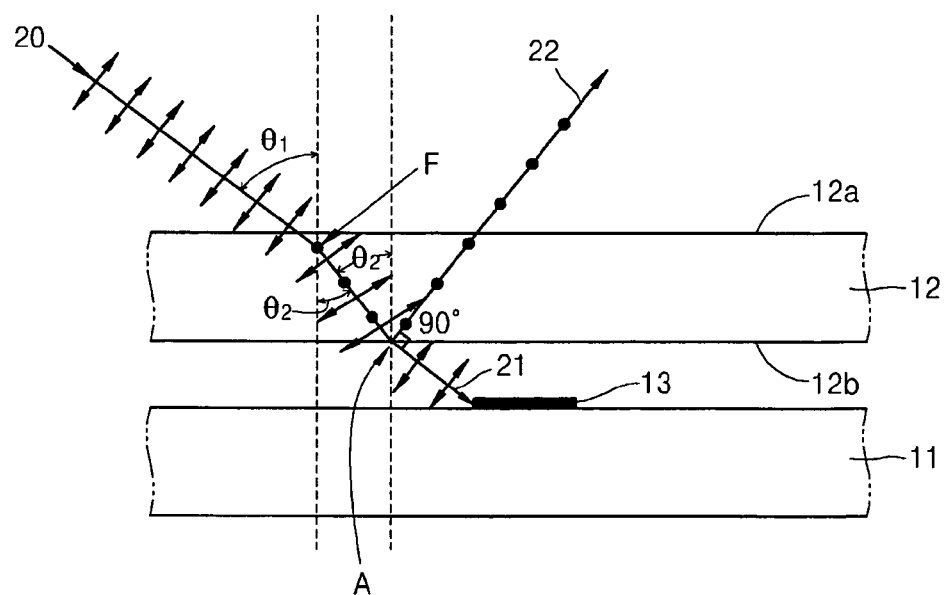

A method and principle of removing a portion of the second substrate 12 from the multi-layered substrate 10 without damaging the circuit pattern 13 by using the laser cutting method will now be described in detail with reference to FIGS. 1 and 3-4. FIGS. 3 and 4 illustrate schematic diagrams for describing a laser cutting method according to embodiments.

As illustrated in FIG. 1, the laser beam 20 may be slantly irradiated onto the second substrate 12, i.e., at an oblique angle with respect to the second substrate 12, in order to cut the second substrate 12. That is, the laser beam 20 is incident on an upper surface of the second substrate 12 at an oblique angle. The laser beam 20 may be a short pulse laser beam. According to embodiments, since the laser beam 20 is slantly irradiated on the second substrate 12, damage to the circuit pattern 13 during the cutting process may be reduced. That is, by slantly irradiating the laser beam 20 toward the second substrate 12, an area of the laser beam 20 reaching the circuit pattern 13 may be increased, thereby reducing an amount of energy per unit area transmitted to the circuit pattern 13. As the amount of energy per unit area transmitted to the circuit pattern 13 is reduced, thermal damage to the circuit pattern 13 may be minimized.

In contrast, when conventionally irradiating a laser beam to cut the second substrate, i.e., not at an oblique angle with respect to the second substrate, high energy of the laser beam may affect not only the second substrate but also the circuit pattern, e.g., the circuit pattern may be short-circuited while preparing a groove to cut the second substrate by irradiating the laser beam on the second substrate. That is, when the groove is formed in the second substrate by irradiating the laser beam, even though most energy of the laser beam is used while forming the groove, some of the energy of the laser beam may penetrate through the second substrate toward the circuit pattern, e.g., according to a material of the second substrate, and thermally damage the circuit pattern or an electrode around an area of the subject that is cut. As such, defects may be generated in a product after the laser cutting.

In detail, as shown in FIG. 3, a part of the laser beam 20 that is slantly irradiated on a cutting surface of the second substrate 12 is also slantly irradiated on the circuit pattern 13 after penetrating through the second substrate 12. That is, a portion of the laser beam 20 may be incident on the circuit pattern 13 at an oblique angle with respect to an upper surface of the circuit pattern 13. Energy intensity of the laser beam 20 is reduced when the laser beam 20 passes a focus F in the second substrate 12, and a diameter of the laser beam 20 is increased after passing the focus F, i.e., at a depth within the second substrate 12 that is deeper than the focus F. Also, according to a spreading angle of the laser beam 20, an area of the laser beam 20 after the focus F, i.e., the diameter of a laser beam 21 on the circuit pattern 13, may be adjusted to be larger than an area of the laser beam 20 on the cutting surface of the second substrate 12. Thus, energy of the laser beam 20 per unit area may be reduced.

That is, by slantly irradiating the laser beam 20, an area of the laser beam 20 that passes through the second substrate 12 is increased according to a slant angle. Therefore, the energy of the laser beam 21 per unit area is reduced. According to the current embodiment, since the area of the laser beam 21 projected on the circuit pattern 13 is increased according to the slant angle of the laser beam 20 irradiated on the second substrate 12, the energy of the laser beam 21 per unit area is reduced. Thus, an effect of the laser beam 21 on the circuit pattern 13 may be reduced. It is noted that the laser beam 20 refers to a laser beam incident on the cutting surface of the second substrate 12, and the laser beam 21 refers to a portion of the laser beam 20 after passing the focus F.

Further, a distance, i.e., as measured along the laser beam 21, between a location where laser cutting is performed, i.e., the focus F where the laser beam 20 is focused, and the circuit pattern 13 is increased because the laser beam 20 is irradiated on the second substrate 12 at a predetermined oblique angle instead of a perpendicular angle. That is, as the laser beam 20 is directed at an angle, the distance along the laser beam 21 is measured along a diagonal direction, as opposed to a normal direction, with respect to the circuit pattern 13, thereby providing a longer distance. Accordingly, as the length of the laser beam 21 within the second substrate 12 increases, an amount of energy of the laser beam 20 absorbed by the second substrate 12 increases. Thus, the energy of the laser beam 21 irradiated on the circuit pattern 13 after penetrating through the second substrate 12 may be reduced according to the increased amount of energy of the laser beam 21 absorbed by the second substrate 12.

In addition, according to an embodiment, the laser beam 20 may be polarized, as shown in FIG. 4. As illustrated in FIG. 4, the laser beam 20 incident on the second substrate 12 may be completely polarized, i.e., a 100% polarized beam, in a direction parallel to the plane of incidence, i.e., may be p-polarized. After the laser beam 20 is refracted at the cutting surface, i.e., an upper surface 12a, the laser beam 20 is bi-directionally polarized according to a double refraction phenomenon, i.e., may have both s and p-polarized light, the s-polarized light is perpendicular to the plane of incidence, traveling through the second substrate 12. A minute crater may be formed at the focus F, i.e., where the laser beam 20 is focused, and the laser beam 20 is reflected at the center and scattered. Also, a part of the laser beam 20 changes its polarization direction according to the double refraction phenomenon.

That is, the laser beam 20 at the focus F may be polarized in different directions at a ratio of about 50:50. As shown in FIG. 4, one part of the laser beam 20 is p-polarized, and another part is s-polarized.

Also, a part of the laser beam 20 that is polarized bi-directionally is reflected from a bottom surface 12b of the second substrate 12, i.e., a reflected laser beam 22, thereby not reaching the circuit pattern 13. As some of the energy of the laser beam 20 left after being used in the laser cutting, i.e., energy not absorbed by the second substrate 12 during cutting, is reflected at the bottom surface 12b of the second substrate 12, the amount of energy of the laser beam 20 applied on the circuit pattern 13 may be reduced even further. The ratio of the reflected laser beam 20 may be adjusted according to an incidence angle θ1 and a refraction angle θ2 of the laser beam 20, and a refraction index of the second substrate 12. In other words, the incidence angle θ1 and the refraction angle θ2 of the laser beam 20 and the ratio of the reflected laser beam 20 may be determined according to Snell's law.

The refraction angle θ2 of the laser beam 20 may be adjusted to satisfy a Brewster's angle, so that the s-polarized portion of the laser beam 20 is reflected at the bottom surface 12b of the second substrate 12. When the refraction angle θ2 satisfies the Brewster's angle under a given condition, the s-polarized portion of the laser beam 20 is totally reflected at the bottom surface 12b of the second substrate 12, as shown in FIG. 4. Accordingly, about 50% of the energy of the laser beam 20 is reflected, thereby reducing the energy of the laser beam 20 reaching the circuit pattern 13.

According to an embodiment, the refraction index of the second substrate 12 may be about 1.5, refraction index of air may be about 1, and the focus F in the second substrate 12 may be about 300 μm to about 500 μm from the upper surface 12a of the second substrate 12. Also, wavelengths of the laser beam 20 mostly have the same effect in a pm level. At this time, when the incidence angle θ1 is adjusted to be about 30° to about 40°, the laser beam 20 is refracted at the refraction angle θ2 of about 52° to about 62° at the focus F. When the refraction angle θ2 satisfies a Brewster's angle under this condition, the s-polarized portion of the reflected laser beam 22 is completely reflected according to Brewster's law. Accordingly, the energy of the laser beam 20 that actually reaches the circuit pattern 13 may be reduced by at least 50% according to such polarization characteristics.

Alternatively, by adjusting the incidence angle θ1 of the p-polarized laser beam 20, the laser beam 20 irradiated on the second substrate 12 may be used in the laser cutting without being reflected. Assuming the refractive indices noted above, this angle will be about 53°. Since there is no laser beam 20 that is reflected, a laser cutting time may be reduced, thereby reducing a time that the laser beam 20 affects the circuit pattern 13.

By slantly irradiating the laser beam 20 on the second substrate 12 during the laser cutting method, the energy of the laser beam 20 per unit area on the circuit pattern 13 may be reduced while the energy of the laser beam 20, which is transmitted to the circuit pattern 13, is reflected as much as possible. Also, by adjusting the incidence angle θ1 to satisfy a Brewster's angle, the efficiency of the laser cutting may be increased. When the multi-layered substrate 10, such as an OLED or an LCD, is cut as described above, damage on the circuit pattern 13 or a pad electrode (not shown) caused by a part of the laser beam 20 that penetrated through the second substrate 12 may be prevented. Accordingly, damage to a circuit pattern due to a laser beam may be reduced by slantly irradiating the laser beam with respect to a cutting surface.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:
1. A laser cutting method, comprising:
providing a multi-layered substrate, such that the multi-layered substrate includes a circuit pattern between stacked first and second substrates; and
removing a part of the second substrate by irradiating a laser beam on the second substrate, the laser beam being irradiated at an oblique angle with respect to an upper surface of the second substrate, the oblique angle being about 30° to about 40° from a plane perpendicular to the substrate, wherein an incidence angle of the laser beam on a bottom surface of the second substrate satisfies Brewster's angle, the bottom surface being opposite the upper surface and facing the first substrate.

2. The laser cutting method as claimed in claim 1, wherein irradiating the laser beam on the second substrate includes irradiating a unidirectional polarized laser beam to be incident on the upper surface of the second substrate, such that the laser beam is bi-directionally polarized after being refracted at the upper surface of the second substrate.

3. The laser cutting method as claimed in claim 2, wherein a part of the bi-directionally polarized laser beam is reflected at the bottom surface of the second substrate.

4. The laser cutting method as claimed in claim 2, wherein a refraction angle of the laser beam satisfies Brewster's angle.

5. The laser cutting method as claimed in claim 1, wherein irradiating the laser beam includes adjusting energy intensity of the laser beam to have a focus closer to an upper surface of the second substrate than to a lower surface of the second substrate, such that an area of the laser beam incident on the upper surface of the second substrate is smaller than an area of the laser beam on the lower surface of the second substrate.

6. The laser cutting method as claimed in claim 1, wherein the laser beam is incident on the upper surface of the second substrate, before being incident on the bottom surface of the second substrate.

7. The laser cutting method as claimed in claim 6, wherein a cutting line of the laser beam is at a contact line on the upper surface of the second substrate, the circuit pattern being on a portion of the first substrate, and the portion of the first substrate corresponding to the removed part of the second substrate.

8. The laser cutting method as claimed in claim 1, wherein the incidence angle on the bottom surface of the second substrate is with respect to an internal surface within the multi-layered substrate, the incidence angle on the bottom surface of the second substrate being different than the laser's incidence angle on the upper surface of the second substrate.

9. A laser cutting method, comprising:
providing a multi-layered substrate, such that the multi-layered substrate includes a circuit pattern between stacked first and second substrates; and
removing a part of the second substrate by irradiating a laser beam on the second substrate, the laser beam being irradiated at an oblique angle with respect to an upper surface of the second substrate, the oblique angle being about 30° to about 40° from a plane perpendicular to the substrate, wherein irradiating the laser beam on the upper surface of the second substrate includes having at least a portion of the laser beam incident on the circuit pattern at an oblique angle.

10. A method of manufacturing an organic light-emitting device, comprising:
forming an organic light-emitting unit and a circuit pattern on a substrate;
forming an encapsulation substrate on the substrate; and
removing a part of the encapsulation substrate by irradiating a laser beam on the encapsulation substrate, the laser beam being irradiated at an oblique angle with respect to an upper surface of the encapsulation substrate, the oblique angle being about 30° to about 40° from a plane perpendicular to the substrate, wherein an incidence angle of the laser beam on a bottom surface of the encapsulation substrate satisfies Brewster's angle, the bottom surface being opposite the upper surface and facing the substrate.

11. The method as claimed in claim 10, wherein irradiating the laser beam on the encapsulation substrate includes irradiating a unidirectional laser beam to be incident on the upper surface of the encapsulation substrate, such that the laser beam is bi-directionally polarized after being refracted at the upper surface of the encapsulation substrate.

12. The method as claimed in claim 11, wherein a part of the bi-directionally polarized laser beam is reflected at the bottom surface of the encapsulation substrate.

13. The method as claimed in claim 11, wherein a refraction angle of the laser beam satisfies Brewster's angle.

14. The method as claimed in claim 10, wherein irradiating the laser beam on the upper surface of the encapsulation substrate includes having at least a portion of the laser beam incident on the circuit pattern at an oblique angle.

15. The laser cutting method as claimed in claim 10, wherein irradiating the laser beam includes adjusting energy intensity of the laser beam to have a focus closer to an upper surface of the encapsulation substrate than to a lower surface of the encapsulation substrate, such that an area of the laser beam incident on the upper surface of the encapsulation substrate is smaller than an area of the laser beam on the lower surface of the encapsulation substrate.

* * * * *